(12) United States Patent
Loibl

(10) Patent No.: US 6,351,699 B1
(45) Date of Patent: Feb. 26, 2002

(54) ELECTRONIC CONTROL UNIT FOR AN AUTOMATIC TRANSMISSION OF A MOTOR VEHICLE AND METHOD FOR ADJUSTING A POSITION DETECTION SENSOR IN THE AUTOMATIC TRANSMISSION OF THE MOTOR VEHICLE

(75) Inventor: Josef Loibl, Regen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/553,324

(22) Filed: Apr. 20, 2000

(51) Int. Cl.[7] .............................................. G06F 15/00
(52) U.S. Cl. ............................. 701/51; 701/64; 74/495
(58) Field of Search ........................... 761/51, 55, 59, 761/64, 66, 68; 73/118.1, 1.79; 74/473.21, 473.3, 490.14, 495, 496, 335

(56) References Cited

U.S. PATENT DOCUMENTS

| 4,698,996 A | | 10/1987 | Kreft et al. .................. 73/1.79 |
| 5,621,317 A | | 4/1997 | Wozniak ................ 324/207.13 |
| 5,775,166 A | * | 7/1998 | Osborn et al. ................ 74/475 |
| 5,867,092 A | * | 2/1999 | Vogt ........................... 340/456 |
| 6,000,296 A | * | 12/1999 | Sundquest ............... 74/473.12 |
| 6,021,368 A | * | 2/2000 | Taniguchi et al. ............. 701/51 |
| 6,189,396 B1 | * | 2/2001 | Barneriter et al. ............ 74/335 |

FOREIGN PATENT DOCUMENTS

| DE | 38 36 145 A1 | 4/1990 |
| DE | 43 40 917 A1 | 6/1995 |
| DE | 196 03 197 C1 | 2/1997 |
| EP | 0 164 832 | 12/1985 |
| EP | 0 844 418 A2 | 11/1996 |

OTHER PUBLICATIONS

O. Erb et al.: "PLCD, A Novel magnetic Displacement Sensor", Sensors and Actuators, vol. A26, No. 1/3, Mar. 1, 1991, pp. 277–282.

* cited by examiner

Primary Examiner—Tan Nguyen
(74) Attorney, Agent, or Firm—Herbert L. Lerner; Laurence A. Greenberg; Werner B. Stemer

(57) ABSTRACT

A control unit for an automatic transmission of a motor vehicle has a position detection sensor that supplies an analog output signal that is dependent on a position of a selector slide. The position detection sensor is adjusted using a self-learning algorithm in an electronic control system of the control unit during operation of the motor vehicle.

8 Claims, 4 Drawing Sheets

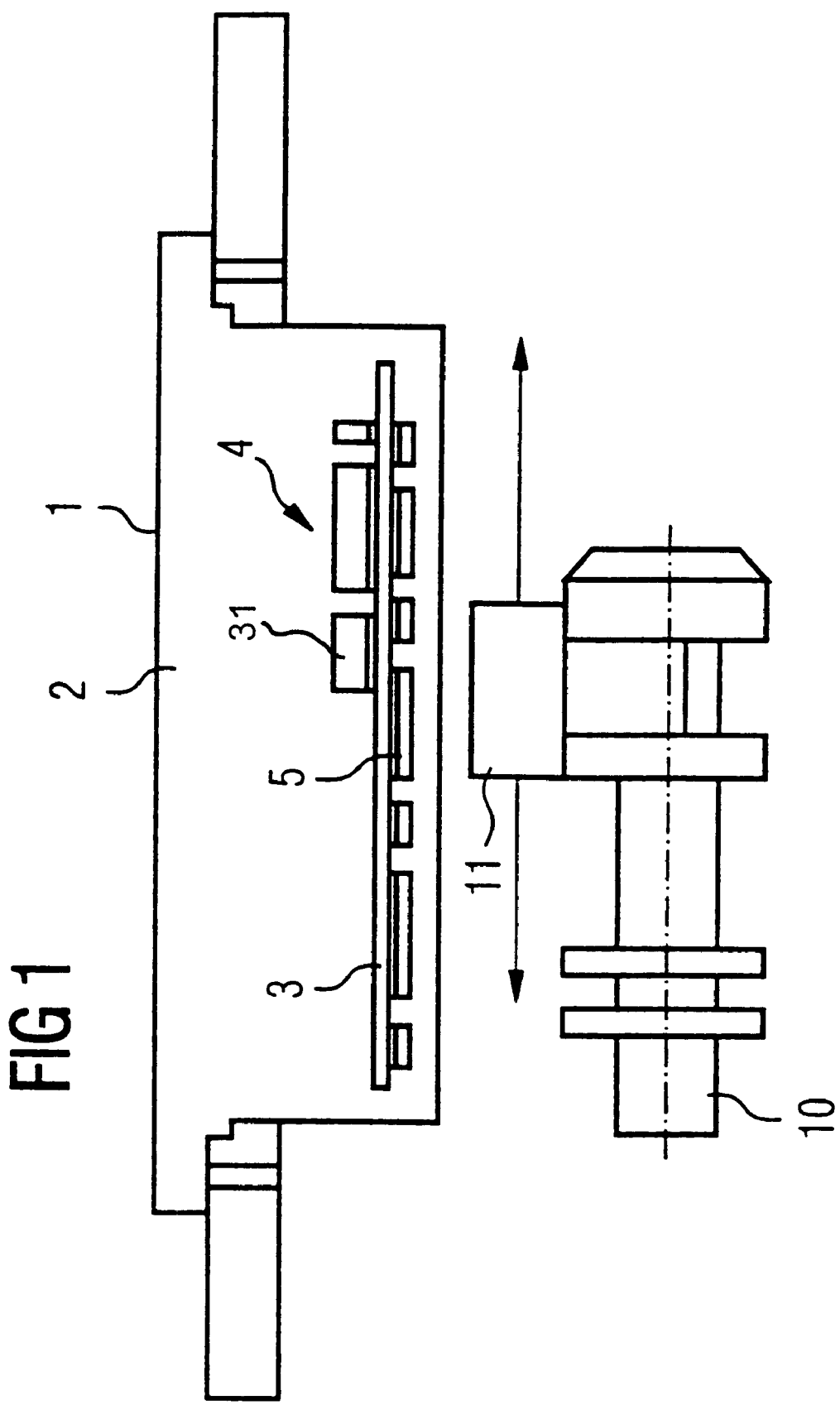

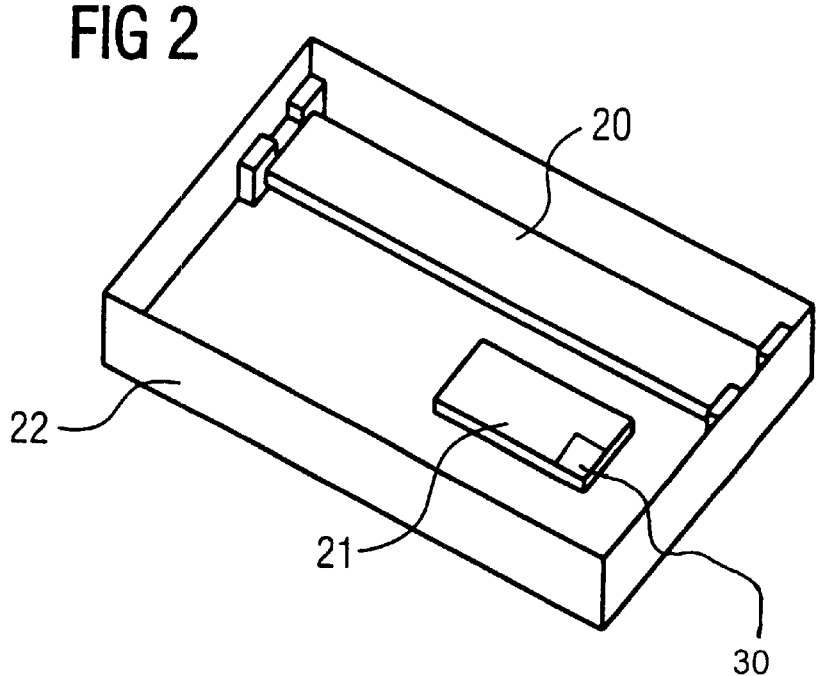
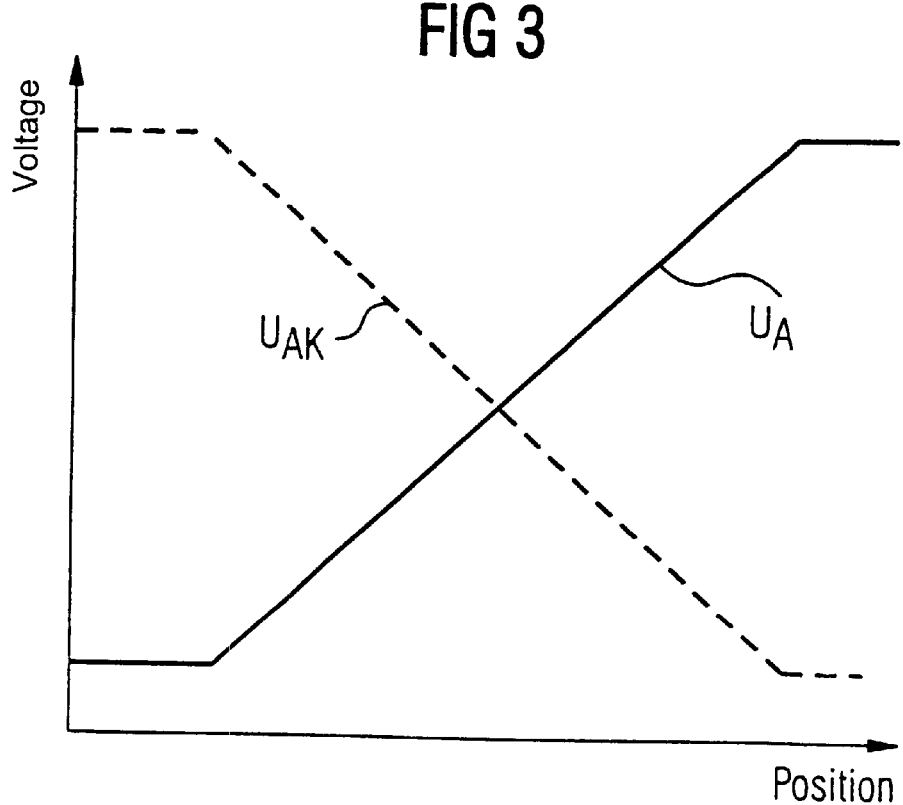

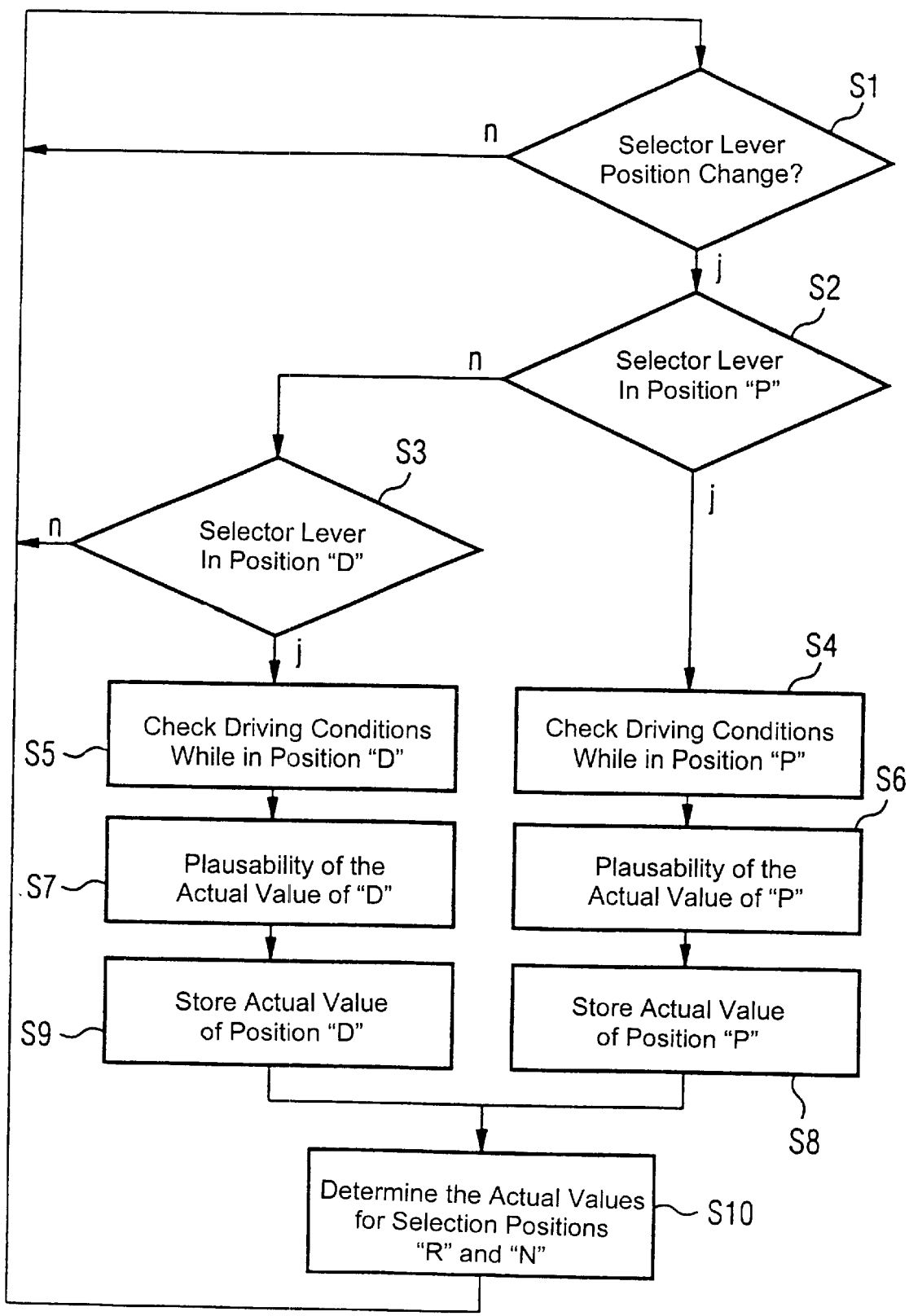

ELECTRONIC CONTROL UNIT FOR AN AUTOMATIC TRANSMISSION OF A MOTOR VEHICLE AND METHOD FOR ADJUSTING A POSITION DETECTION SENSOR IN THE AUTOMATIC TRANSMISSION OF THE MOTOR VEHICLE

BACKGROUND OF THE INVENTION

Field of the Invention

The invention relates to an electronic control unit for an automatic transmission of a motor vehicle and a method for adjusting a position detection sensor in the automatic transmission of the motor vehicle.

Automatic transmissions for passenger cars are usually electronically controlled. The control units for this purpose have hitherto been provided as so-called "stand-alone units" in a control box that protects against environmental influences, or have been directly installed in the passenger space of the vehicle. Recently, for reasons of cost and quality, a new approach of integrating the electronic control system and an associated sensor system directly into the automatic transmission has been adopted. Fundamental requirements for the operation of the electronics in the transmission are the operational capability over a wide temperature range, for example −40° C. to 140° C., tightness with respect to ATF transmission oil and sufficient resistance to vibration, for example 30 g. Optimized temperature resistance is obtained by bonding the electronic circuit on a ceramic substrate with a heat conducting adhesive onto a metal baseplate, for example made of aluminum.

In addition to rotational speed sensors, pressure sensors and temperature sensors, customary transmission controllers for automatic transmissions have a position detection sensor that is used to sense which driving position of the automatic transmission is set. The latter is carried out, for example, by setting a so-called selection position switch to one of "P" (=Park), "R" (=Reverse), "N" (=Neutral) or "D" (=Drive) positions. The selection position switch—also referred to below as a selector lever—is mechanically connected to the automatic transmission by activating a selector slide that can move in a linear or rotary fashion. The selector slide is incorporated into the hydraulic part of the transmission controller. As a result of the sensing of the selector slide position by the position detection sensor, the drive position which has been set is communicated to the electronic control unit.

In terms of the position detection, it is then known to provide an independent sensor that is packed in an oil-tight fashion in a housing in order to protect against the surrounding medium, namely transmission oil. The electrical connection of the sensor using appropriate leads to the control unit must also be of an oil-tight configuration.

Various measurement principles are conceivable for the configuration of the sensors. German Patent DE 196 03 197 C1 discloses the use of magnetic field sensors which are based on the Hall effect. In such configurations the measurement quality is influenced considerably by an air gap between the magnet and the sensor element. For this reason, a trigger element (PES slide) which is embodied as a slide and in which an encoded magnetic plate or a signal transmitting magnet is integrated is guided with precise tolerances in guide grooves of the sensor housing. The selector slide, which is internal to the transmission and which is connected rigidly to the selector lever in the interior of the vehicle via a linkage or a Bowden cable, engages in the PES slide. If the selector lever is moved from one position into another, the moveable PES slide is also adjusted by the selector slide in the transmission, with the result that the electronic system of the transmission can input the new selector lever position.

Position detection sensors based on the Hall effect are, like position detection sensors that are based on electromechanically on the switch or slide principle, of exclusively digital configuration. The absolute accuracy of the system obtained depends on a chain of tolerances of the electronic and mechanical components involved. It is no longer necessary to perform static correction after installation in the vehicle or transmission, or to perform dynamic correction during operation.

SUMMARY OF THE INVENTION

It is accordingly an object of the invention to provide an electronic control unit for an automatic transmission of a motor vehicle and method for adjusting a position detection sensor in the automatic transmission of the motor vehicle that overcome the above-mentioned disadvantages of the prior art devices and methods of this general type.

With the foregoing and other objects in view there is provided, in accordance with the invention, an electronic control unit for an automatic transmission of a motor vehicle, the electronic control unit including a fluid-tight housing; an electronic control system accommodated in the housing; and a position detection sensor for sensing a position of a selector slide. The position detection sensor supplying an analog output signal that is dependent on the position of the selector slide, and the position detection sensor is dynamically adjusted using a self-learning algorithm stored in the electronic control system during operation of the motor vehicle.

The invention is based on the technical problem of incorporating the position detection sensor into an electronic control unit with a high degree of accuracy in a simple and cost-effective way, and of providing a method which permits the sensor to be adjusted during operation in the vehicle.

In addition to digital (Hall sensor) sensor principles, analog ones, for example on the basis of a permanent magnetic linear contactless displacement (PLCD) sensor, are also known for position detection sensors. A PLCD is based on a coil configuration that contains an integrated electronic evaluation circuit, for example as an ASIC module, and generates an analog signal, preferably a voltage signal, on the basis of the position of signal transmitting magnets relative to the sensor. Such a module is marketed by Siemens, for example.

In position detection sensors, the accuracy with which the selection positions (P, R, N or D) can be sensed is a decisive quality feature. In contrast to digital position detection sensors, in analog position detection sensors it is possible to adjust the sensors statically or dynamically in order to increase the accuracy in the system. If a self-learning algorithm is used for this purpose, the sensor can be adjusted completely automatically during operation in the vehicle. In this way, installation tolerances and aging effects of the position sensor in the transmission are largely eliminated.

Other features which are considered as characteristic for the invention are set forth in the appended claims.

Although the invention is illustrated and described herein as embodied in an electronic control unit for an automatic transmission of a motor vehicle and method for adjusting a position detection sensor in the automatic transmission of the motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic illustration of a control unit having a device for position detection according to the invention;

FIG. 2 is a perspective view of a position detection sensor having PLCD sensor elements;

FIG. 3 is a graph of a characteristic curve of an output signal of the PLCD sensor element;

FIG. 5 is a flowchart of a self-learning algorithm according to the invention.

DESCRIPTION OF THE PREFERRED EMBODIMENTS

Figure 4:
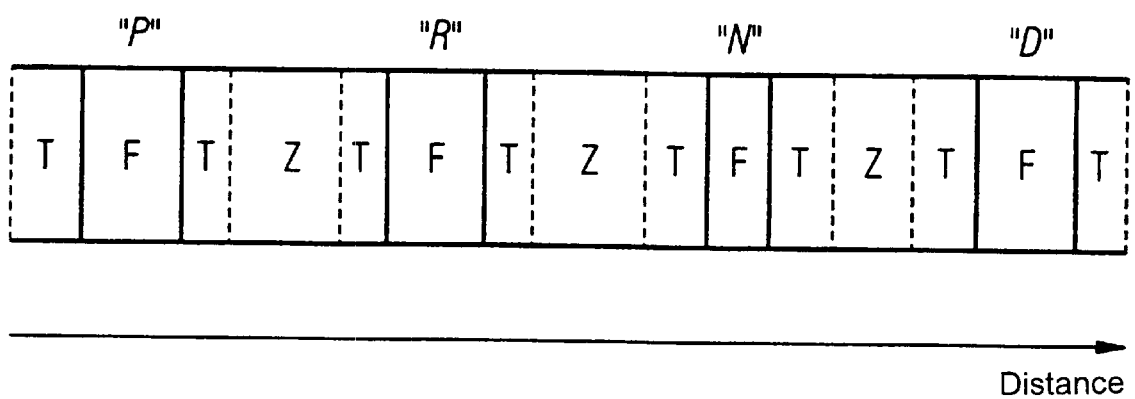
FIG. 4 is a schematic illustration of selection positions of the position detection sensor.

In all the figures of the drawing, sub-features and integral parts that correspond to one another bear the same reference symbol in each case. Referring now to the figures of the drawing in detail and first, particularly, to FIG. 1 thereof, there is shown an electronic control unit for an automatic transmission of a motor vehicle. The electronic control unit has a housing 1 and an interior space 2 of the housing 1 is sealed hermetically against the ingress of fluid, in particular, it is oil-tight. A circuit carrier 3, for example a printed circuit board or a flex conductor foil with an electronic control system 4 (illustrated schematically by components) is accommodated in the interior 2. A position detection sensor 5, which is embodied as a permanent magnetic linear contactless displacement (PLCD) sensor 5 is disposed in the housing 1. If appropriate, an electronic drive and evaluation system is also disposed in the interior 2 of the housing 1. The position detection sensor 5 is advantageously disposed directly on the circuit carrier 3 of the electronic control system 4.

By use of the position detection sensor 5, it is possible to detect a position of a selector slide 10, which is rigidly connected to a non-illustrated selector lever in the interior of the vehicle via a linkage or a Bowden cable, and to communicate the position to the electronic control system 4. When inductive sensors, for example a PLCD, are used, an air gap between a signal transmitting element and a sensor element is significantly less critical than in the known Hall sensors. A signal transmitting magnet 11 can therefore be mounted directly on the selector slide 10. Guiding with precise tolerances in an additional PES slide is not absolutely necessary.

According to the invention, an analog sensor principle, for example on the basis of the PLCD, is used to detect the position of the selector slide 10. Such a sensor is based on a coil configuration 20 which is accommodated together with an integrated electronic evaluation circuit 21, for example in the form of an ASIC module, in a sensor housing 22 (FIG. 2).

FIG. 3 illustrates a possible output signal of the PLCD as a function of the position of the selector slide 10. Here, the output of the sensor element may, for safety reasons, be embodied as a redundant differential interface. As a result, a complementary signal $U_{AK}$ is obtained in addition to an output voltage signal $U_A$. By comparing the output voltage signal $U_A$ with the complementary signal $U_{AK}$, malfunctions of the PLCD can be detected. The linear voltage signal can also be converted into discrete output values within the PLCD by an A/D converter integrated into the PLCD module. The output of the sensor element is then embodied as a serial interface or bus interface.

Linearly disposed switching points are predefined by the selector slide 10 with the signal transmitting magnet 11. It is possible here to distinguish between driving positions F, intermediate positions Z and tolerance ranges T (FIG. 4). Because the position detection sensor 5 in the transmission of the motor vehicle constitutes a component that is critical for safety, a high degree of operational reliability of the position detection sensor 5 must be ensured. Driving positions F and intermediate positions Z of the selector slide 10 must be detected unambiguously. In contrast to digital position detection sensors, for example Hall elements, in the case of analog position detection sensors 5 it is possible to adjust the sensor statically or dynamically, in order to ensure the desired system accuracy.

In this context, a number of different ways of adjusting the sensor 5 are possible.

First, a rough adjustment during the production of the position detection sensor 5 can be performed. In a standardization station, the selection positions or selection ranges are run through with a reproducible standardization process and, by use of characteristic curve adaptation the output voltages are set in such a way that selection positions in the form of voltage bands are assigned to the switch positions P, R, N and D. The voltage bands are permanently stored in a nonvolatile memory 30 of the electronic evaluation circuit 21 of the position detection sensor 5. In this way, fabrication tolerances of the position detection sensor 5 can largely be eliminated. If the basic accuracy of the sensors is already sufficient, that is to say the fabrication tolerances are sufficiently small, the rough adjustment can be dispensed with.

Second, a fine adjustment during production of the motor vehicle can be performed. A separate calibration procedure is carried out in each fabricated motor vehicle. This calibration procedure is initiated, for example, by a start signal via a serial interface of the position detection sensor 5. At least two of the switched positions present, preferably the limit positions P and D are respectively engaged and the corresponding signal level or signal value is stored in a nonvolatile memory 31 in the electronic control system 4. The signal level bands or voltage bands for the respectively engaged switched positions are updated on the basis of the stored values. The voltage bands for the switched positions which are not engaged can be calculated with sufficient accuracy on the basis of the linear arrangement of the switching points, and the corresponding voltage values can also be stored in the nonvolatile memory 31. By engaging all the switched positions present, maximum accuracy of the corresponding voltage values is ensured. By the fine adjustment of the position detection sensor 5 during the production of the motor vehicle it is possible to eliminate to a large extent installation tolerances in the transmission and the vehicle. However, special test benches and additional time during the production sequence are necessary for this. An advantageous alternative to the fine adjustment of the sensor 5 during the production of a motor vehicle is explained in more detail below with reference to FIG. 5.

Third, an alternative or further fine adjustment of the position detection sensor 5 during operation in the vehicle (self-learning algorithm) can be performed. The self-learning algorithm is illustrated, by way of example, for determining by measuring the corresponding signal levels or voltage values for the selection positions or ranges P and D. The signal level bands for the other selection positions R and N can be calculated on the basis of the linear configuration of the switching points. However, the method according to the invention can be applied to any combination of at least two of the selection positions P, R, N and D present. A maximum level of accuracy is obtained if none of the selection positions is calculated but instead all are determined by measuring using the method described below.

In step S1, it is checked continuously or periodically whether the position of the selector lever, and thus of the selector slide, has been changed (FIG. 5). If a change is detected, it is tested in steps S2 and S3 whether the selector lever is in one of the selection positions P or D. For this purpose, the output voltage of the position detection sensor 5 is compared with respective lower and upper voltage limiting values of the selection positions P and D. If this reveals that the selector lever is in one of the selection positions P or D, the driving conditions of the respective selection position are checked in steps S4 and S5. While it is tested, for example, in the selection position D whether the speed of the vehicle is above a predefined limiting value, it is ensured in the selection position P that both the speed of the vehicle and the engine speed are equal to zero. If the driving conditions are fulfilled in the detected selection positions, the voltage values at that given time are tested for plausibility in steps S6 and S7. In order to avoid, for example, voltage peaks being registered, it is possible here to request, for example, the presence of the instantaneous voltage value over a predefined time period. It is also to possible to consider forming average values from a plurality of successive voltage values. If the instantaneous D or P values are considered plausible, the instantaneously determined voltage values for the selection positions are stored in the nonvolatile memory 31 of the electronic control system 4 (steps S8 and S9). The voltage bands for the respective selection positions are continuously updated on the basis of these values. In a step S10, the voltage bands for the other selection positions R and N are calculated on the basis of the updated selection positions. A maximum degree of accuracy of the adjustment of the position detection sensor 5 is achieved if, in addition to the selection positions P and D, the selection positions R and N are also determined using the method described above. This eliminates possible inaccuracies resulting from the calculation of selection positions (step S10).

An analogous method can also be applied if the output of the position detection sensor 5 is embodied as a serial interface or bus interface and discrete values are transmitted to the electronic control system 4.

The fine adjustment of the analog position detection sensor 5 during operation in the vehicle (self-learning algorithm) provides the great advantage that installation tolerances in the transmission and vehicle are largely eliminated with little effort. Likewise, aging efforts are compensated by the continuous updating of the voltage bands for the individual selection ranges. By using the analog position detection sensor 5 in conjunction with the self-learning algorithm according to the invention it is possible, in contrast to digital position detection sensors, to detect the selection ranges of the positions of the automatic transmission very accurately and largely independently of the tolerances of the system as a whole.

I claim:

1. An electronic control unit for an automatic transmission of a motor vehicle, the electronic control unit comprising:
    a fluid-tight housing;
    an electronic control system accommodated in said housing; and
    a position detection sensor for sensing a position of a selector slide, said position detection sensor supplying an analog output signal being dependent on the position of the selector slide, and said position detection sensor being dynamically adjusted using a self-learning algorithm stored in said electronic control system during operation of the motor vehicle.

2. The control unit according to claim 1, including a signal transmitting magnet disposed directly on the selector slide.

3. The control unit according to claim 1, wherein said position detection sensor has an output embodied as a redundant differential interface.

4. The control unit according to claim 1, wherein the analog output signal is converted within said position detection sensor into discrete output values, and said position detection sensor has an output embodied as one of a serial interface and a bus interface.

5. The control unit according to claim 1, wherein said position detection sensor is a permanent magnetic linear contactless displacement (PLCD) sensor.

6. A method for adjusting a position detection sensor supplying an analog output signal in dependence on a position of a selector slide, which comprises:
    checking whether the position of the selector slide has changed;
    testing whether the selector slide is located in one of at least two predefined selection positions if the position has changed;
    storing a signal level of the analog output signal of the position detection sensor in a memory if the selector slide is in one of the predefined selection positions resulting in a stored signal level;
    determining which signal level bands, which are updated on a basis of the stored signal level, for a respective selection position of the predefined selection positions; and calculating further signal level bands for other selection positions of the selector slide on a basis of the stored signal level, and storing the further signal levels in the memory.

7. The method according to claim 6, which comprises storing the signal level of the analog output signal of the position detection sensor in the memory only if predefined driving conditions of the respective selection position are fulfilled.

8. The method according to claim 6, which comprises storing the signal level of the analog output signal of the position detection sensor in the memory only if the signal level is considered plausible.

* * * * *